United States Patent
Urso

(10) Patent No.: US 10,709,531 B1
(45) Date of Patent: Jul. 14, 2020

(54) AUTOMATIC DENTAL FLOSSER

(71) Applicant: Charles L. Urso, Waltham, MA (US)

(72) Inventor: Charles L. Urso, Waltham, MA (US)

( * ) Notice: Subject to any disclaimer, the term of this patent is extended or adjusted under 35 U.S.C. 154(b) by 457 days.

(21) Appl. No.: 15/731,738

(22) Filed: Jul. 26, 2017

(51) Int. Cl.
*A61C 15/04* (2006.01)

(52) U.S. Cl.
CPC ............ *A61C 15/047* (2013.01); *A61C 15/04* (2013.01); *A61C 15/048* (2013.01); *A61C 15/043* (2013.01)

(58) Field of Classification Search
CPC ..... A61C 15/04; A61C 15/043; A61C 15/045; A61C 15/046; A61C 15/047; A61C 15/048
USPC ................................... 206/524.8, 613.1, 614
See application file for complete search history.

(56) References Cited

U.S. PATENT DOCUMENTS

| | | | | |
|---|---|---|---|---|
| 1,992,764 A | * | 2/1935 | Perry | F16K 15/202 473/610 |
| 3,101,538 A | * | 8/1963 | Dewyer | B65H 35/002 83/649 |
| 3,700,180 A | * | 10/1972 | Sitz | B65H 54/64 242/386 |
| 3,814,114 A | * | 6/1974 | Roberts | A61C 15/046 132/325 |
| 3,815,315 A | * | 6/1974 | Glick | A61B 17/06133 53/425 |
| 3,830,247 A | | 8/1974 | Kaphalakos | |
| 3,902,510 A | | 9/1975 | Roth | |
| 4,821,752 A | * | 4/1989 | Widlak | A46B 5/0095 132/309 |
| 5,188,133 A | | 2/1993 | Romanus | |
| 5,211,353 A | * | 5/1993 | Lewin | B65H 75/18 242/118.41 |
| 5,657,780 A | * | 8/1997 | Giacopuzzi | A61C 15/046 132/325 |
| 5,762,078 A | * | 6/1998 | Zebuhr | A61C 15/047 132/322 |
| 5,906,213 A | | 5/1999 | Diffendal | |
| 5,950,641 A | * | 9/1999 | Taveras | A46B 7/046 132/309 |
| 6,450,441 B2 | * | 9/2002 | Ripplinger | B65H 75/14 242/614.1 |
| 6,874,726 B2 | * | 4/2005 | Ripplinger | B65H 75/14 242/610.6 |
| 7,392,810 B2 | | 7/2008 | Apotheker et al. | |
| 7,467,631 B2 | | 12/2008 | Bergman et al. | |
| 9,510,921 B1 | | 12/2016 | Urso | |

(Continued)

*Primary Examiner* — Tatiana L Nobrega

(57) ABSTRACT

An automatic dental flosser (10,11,37) includes a floss cartridge or attachment (14,15,17,19) detachably connectable to a power driver (12,13). The attachment comprises a plastic bifurcated member (16,82) supporting a dental floss span for flossing teeth. A rotatably supported floss supply spool (58) is connected to the bifurcated member for continuously replacing used floss spans with clean floss spans. A rotatably supported floss take-up spool (50,72) is connected to the bifurcated member for being driven by the driver to wind used floss drawn from the bifurcated member. Means for encapsulating the used floss and for distributing antimicrobial fluid (69) on the used floss are included to inhibit microbial activity. Means are provided to distribute used floss along a take-up spool for high-capacity used floss storage until disposal of the cartridge. In the unlikely event of a floss snag, such as on a dental appliance, a built-in floss cutter (88) can instantly detach the flosser.

18 Claims, 3 Drawing Sheets

(56) References Cited

U.S. PATENT DOCUMENTS

| | | | | |
|---|---|---|---|---|
| 2003/0134255 | A1* | 7/2003 | Masterman | A61C 15/00 433/118 |
| 2004/0163665 | A1* | 8/2004 | Alvarez | A61C 15/047 132/322 |
| 2008/0257377 | A1* | 10/2008 | Burrows | A61C 15/043 132/322 |
| 2008/0315029 | A1* | 12/2008 | Eggen | B65H 49/22 242/557 |
| 2009/0165814 | A1* | 7/2009 | Welt | A46B 5/0075 132/323 |
| 2010/0139689 | A1* | 6/2010 | Couch | A61C 15/047 132/322 |
| 2010/0163652 | A1* | 7/2010 | Kajuch | B05B 7/0425 239/548 |
| 2013/0316070 | A1* | 11/2013 | Patel | A61C 15/043 427/2.29 |

* cited by examiner

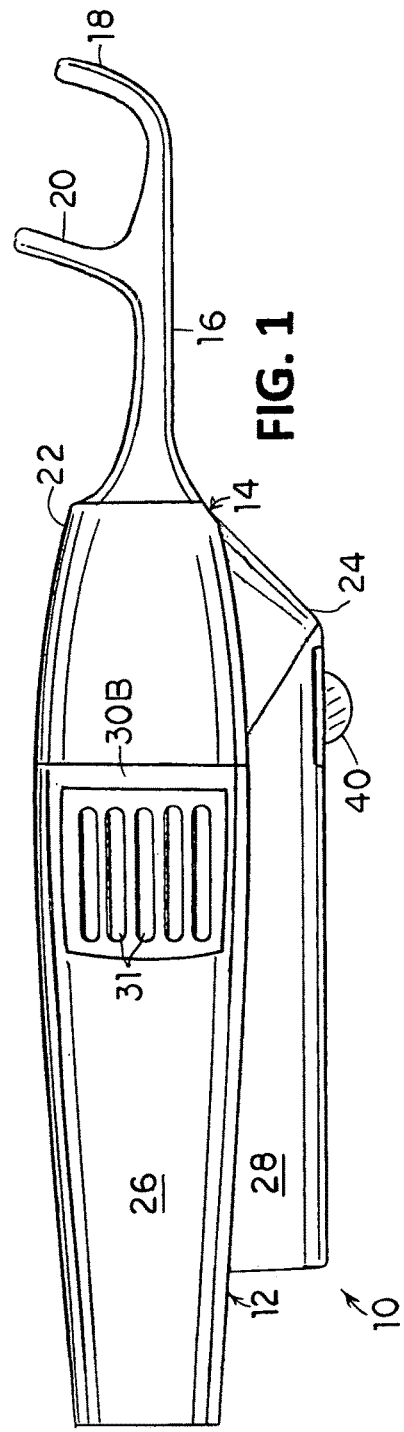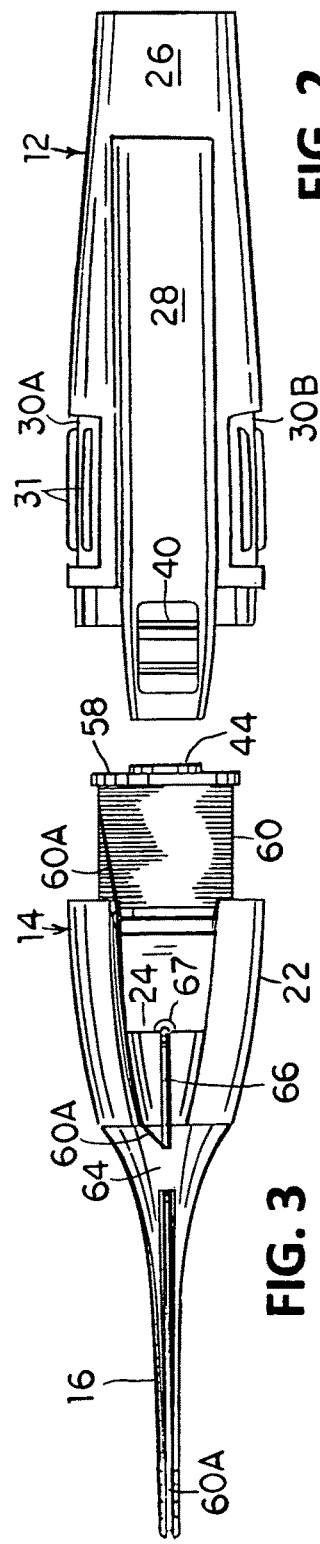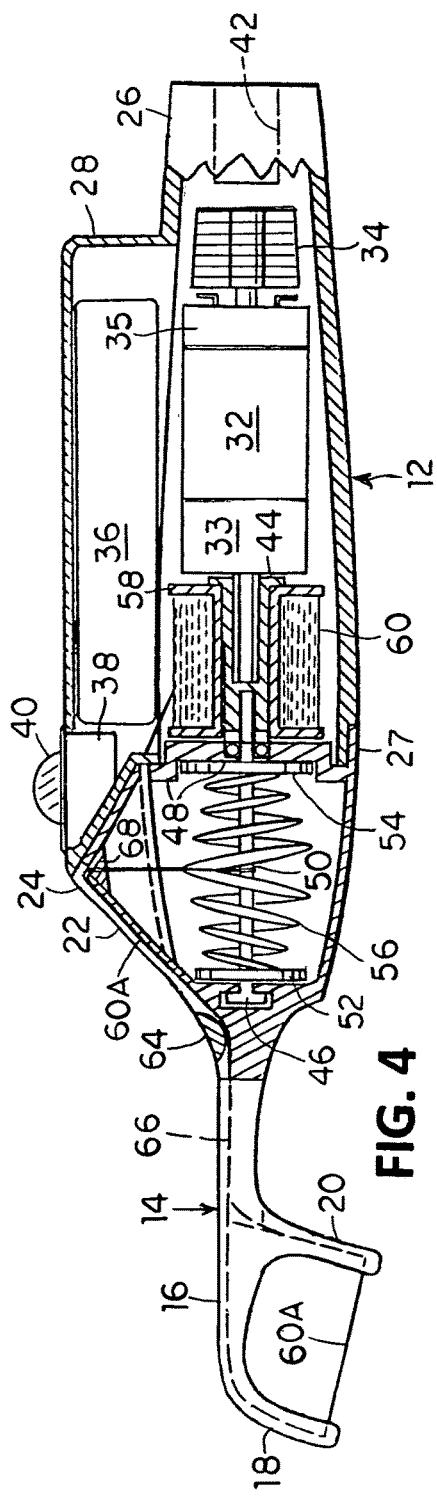

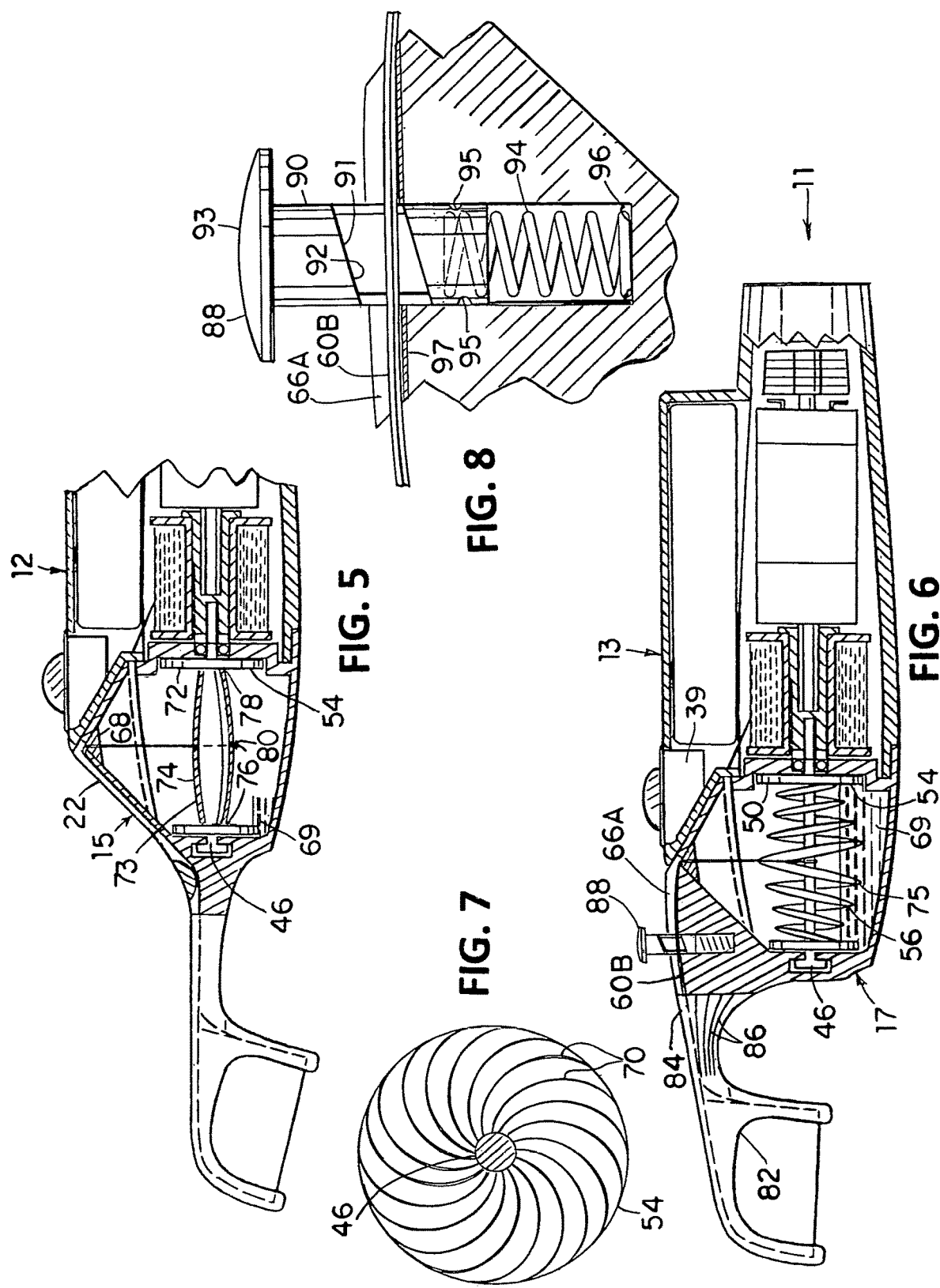

US 10,709,531 B1

AUTOMATIC DENTAL FLOSSER

A portion of the disclosure of this patent document contains material which is subject to copyright protection. The copyright owner has no objection to facsimile reproduction by anyone of the patent document or the patent disclosure, as it appears in the Patent and Trademark Office file or records, but otherwise reserves all copyrights whatsoever.

CROSS REFERENCE TO RELATED APPLICATIONS

This application is related to U.S. Pat. No. 9,510,921 and claims the benefit of provisional patent application Ser. No. 62/602,498 filed Apr. 25, 2017 and provisional patent application Ser. No. 62/604,533 filed Jul. 10, 2017 by the present inventor.

BACKGROUND

Field

This application relates to dental hygiene devices, specifically to powered dental flossers.

The Problem

Conventional methods of flossing are loathed by almost everyone because the conventional methods are tedious, messy, and inefficient. Moreover, the effectiveness of conventional methods is dubious. The Associated Press, for example, reported in Aug. 2, 2016 that there is little proof of the efficacy of manual flossing for interdental plaque removal. Furthermore, the marketplaces lack a powered flosser that continuously replaces used floss with clean floss while flossing. Such a feature will be very advantages for dental hygiene. Attempts to produce a flosser having such a feature have been described in the patent records, but overcoming all of the challenges of continuous floss replacement has been elusive. As this document is being prepared, consumers and dental professionals are still waiting for a commercially manufactured flosser to replace the tedious and inefficient conventional methods of flossing.

SUMMARY

An automatic dental flosser described herein includes a cartridge or attachment detachably connectable to a power driver. The attachment comprises a plastic frame supporting a dental floss span for flossing teeth. A rotatably supported floss supply spool is connected to the frame for continuously replacing used floss spans with clean floss spans. A rotatably supported floss take-up spool is connected to the frame for being driven by the driver to wind used floss drawn from the frame. Means are provided to distribute used floss along the take-up spool core for high-capacity storage. Means for encapsulating and sanitizing the used floss are included to inhibit microbial activity. Safety features include a built-in floss cutter to instantly detach the flosser from snagged floss in the event that a floss snag occurs in the user's oral cavity.

Advantages

The ability of the automatic dental flosser to continuously replace used floss with clean floss while flossing avoids spreading oral microbes, greatly enhances cleaning efficacy, carries away the plaque debris, and longitudinal motion of the moving spans assists in inserting the floss in between tightly abutting teeth. In addition, the automatic flosser adds orbital motions to the floss spans thereby cleaning and polishing as motor-driven floss follows dental contours. Antiseptic encapsulation of the used floss prevents odors and enables hygienic high-capacity storage of used floss until disposal of the attachment when the clean floss supply runs out.

DRAWINGS—FIGS

The accompanying drawings in combination with the description herewith illustrate features of embodiments. Like reference numerals refer to the same parts. The drawings are not necessarily to scale.

FIG. 1 is an external side view of an automatic dental flosser embodiment including a flosser cartridge or flosser attachment detachably connected to a power driver.

FIG. 2 is a top view of the power driver of the flosser of FIG. 1 wherein the power driver is detached from the flosser attachment.

FIG. 3 is a top view of the flosser attachment of the flosser of FIG. 1.

FIG. 4 is a side view of the flosser of FIG. 1 shown mostly in section taken through a longitudinal midline of the flosser wherein a fluid-tight capsule enclosing a take-up spool is evacuated of air.

FIG. 5 is a fragmental side view of a second flosser embodiment wherein the fluid-tight capsule, evacuated of air, contains an alternative take-up spool and antimicrobial fluids for sanitizing used floss.

FIG. 6 is a side view of a third flosser embodiment having a floss cutter as a safety device.

FIG. 7 is an enlarged side view of a floss-retaining flange of a take-up spool showing that the flange surface facing the spool core defines a plurality of spiral grooves.

FIG. 8 is an enlarged fragmental view of the flosser of FIG. 6 showing details of the floss cutter.

DETAILED DESCRIPTION—FIGS. 1-10

First Embodiment

Figure 10:
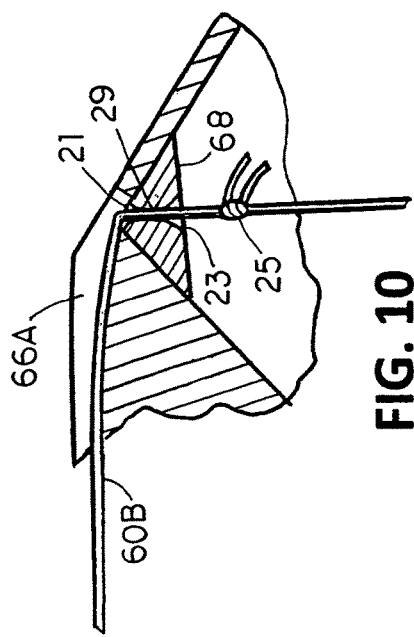
FIG. 10 is an enlarged fragmental view of the flosser's capsule of FIG. 6 in greater detail.
Figure 9:
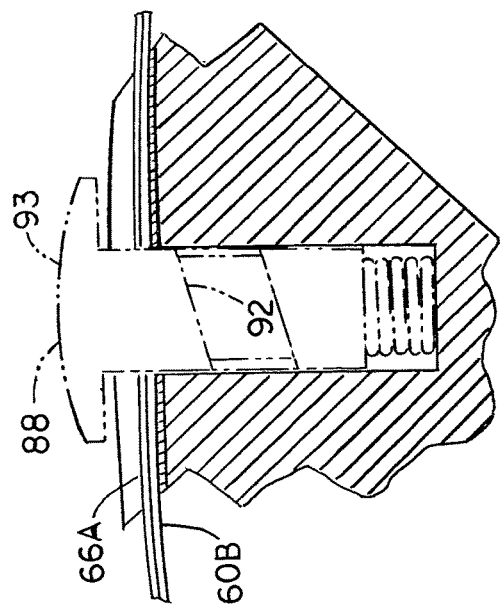
FIG. 9 shows a phantom image of the cutter of FIG. 8 when pushed to a second position.

Beginning in FIG. 1, a first embodiment of the automatic dental flosser 10 is shown exteriorly. Flosser 10 includes an elongate power driver 12 and a flosser cartridge or flosser attachment 14 detachably connected to driver 12. Detachable attachment 14 includes an elongate rigid plastic frame or bifurcated member 16 forming a pair of flossing tines 18 and 20. Bifurcated member 16 is fixed to a hollow fluid-tight plastic enclosure or capsule 22 forming a hollow sloped ridge 24.

Power Driver 12—FIGS. 1, 2 and 4

Power driver 12 (FIGS. 1-2) includes an elongate hollow plastic main housing 26 integrated in parallel with a smaller elongate plastic power cell housing 28. Both housings are designed and shaped to conform with capsule 22 of flosser attachment 14. Driver housings 26 and 28 are made of rigid plastic except for a pair of opposed flexible elastomeric panels 30A and 30B. Both flexible panels are attached by conventional means to cover opposing windows, respectively, defined in an anterior end portion of housing 26. Each panel 30A and 30B is a mirror image of the other and each panel includes longitudinal ribs 31 so that the flexibility of the panels is toward the interior and exterior of housing 26. Ribs 31 inhibit flexibility longitudinally thereof and provide slip resistance when flosser 10 is held by a user. The primary function of panels 30A and 30B is explained in the Operation of Flosser 10 section hereinafter.

More details of driver 12 are shown in FIGS. 2 and 4. A duel-shaft gear motor 32, having speed-reduction gearboxes 33 and 35 for driving each shaft, respectively, is mounted within housing 26 by conventional means. A posterior drive shaft of motor 32 is coaxially fixed in a bore of an eccentric weight 34 by press fit. Within housing 28 is a rechargeable power cell 36. A conventional DC momentary reversing rocker switch 38 is conventionally mounted in a window defined in an anterior end portion of housing 28. Switch 38 includes a power button 40 positioned exteriorly of housing 28. Switch 38 is electrically connected to power cell 36 and motor 32 to energize the motor for rotating its drive shafts in forward or reverse directions when button 40 is rocked forward or rearward, respectively. An electric circuit (not shown) electrically connecting power cell 36, switch 38, and motor 32 is conventional. Power cell 36 is rechargeable by means of a conventional base charging peg (not shown) inserted in a peg chamber 42. A conventional battery charging coil (not shown) enables power cell 36 to be electrically charged. Motor 32 includes an anterior drive shaft having a hex-shaped cross section. The anterior drive shaft is keyed to mate with flosser attachment 14 by being coaxially and detachably received in an elongate posterior cavity defined in an elongate spindle 44. The spindle cavity is hex-shaped in cross-section to conform with the anterior drive shaft.

Flosser Attachment 14—FIGS. 1, 3 and 4

Spindle 44 (FIG. 4), described above, is coaxially and fixedly press fitted onto a posterior end portion of a driven shaft 46. A flanged anterior end portion of shaft 46 is rotatably supported and is retained in a disk-shaped cavity defined in an anterior portion of capsule 22. A posterior end portion of shaft 46 is rotatably supported and is sealed fluid-tight in an O-ring tightly fitted in an O-ring holder defined as a recess in a posterior wall 48 of capsule 22.

A central portion of shaft 46 forms the core hub of an elongate floss take-up spool 50 having end flanges 52 and 54 wherein spool 50 is enclosed in fluid-tight capsule 22. Floss distributing augers 56 together form a generally bicone shape and are coaxially fixed to shaft 46. Augers 56 function as explained in U.S. Pat. No. 9,510,921.

Spindle 44, shown in FIGS. 3 and 4, includes a posterior end portion forming a flange that retains a floss supply spool 58 having a large supply of clean floss 60 wound thereon. Spool 58 fits loosely on spindle 44 to slip around the spindle as floss is drawn from spool 58. A floss strand 60A, extending from the floss supply, passes over ridge 24 and through a guide groove 66 that passes under a bridge 64 and extends along bifurcated member 16. Strand 60A then extends into a guide groove of flossing tine 18. From there the floss strand spans to tine 20 and into a guide groove therein to form a floss span between the tines.

From tine 20, floss strand 60A extends along groove 66 (FIG. 3) on the outer surface of capsule 22 and then the floss enters the capsule through an annular aperture 67 in ridge 24. Referring to FIG. 4, glued under ridge 24 and closing aperture 67 is an elastomeric self-sealing rubber floss bearing 68 that forms a fluid-tight seal around floss strand 60A. (The floss bearing could alternatively be made of silicone or other self-sealing elastomer.) Finally, strand 60A extends to the middle of the core of take-up spool 50 and is attached thereto. Hence, when spool 50 is driven to rotate, used floss is wound and sealed in fluid-tight capsule 22.

At the factory, capsule 22 is evacuated of air by insertion of a hollow needle (not shown) through aperture 67 and bearing 68 wherein the needle is attached to a pump (not shown) that draws the air out of the capsule. The air can be partially replaced with antimicrobial fluids such as those described for the embodiments described hereinafter to prevent odorous gases from being generated. A partial vacuum should remain to allow a large accumulation of used floss.

Sloped walls of capsule 22 form ridge 24. Floss strand 60A has sufficient space between the sloped capsule walls to traverse the entire length of the elongate core of spool 50 when the spool rotates. Hence, the elongate spool core can wind and store a substantial amount of used floss until disposal of attachment 14.

The ridge-shape of fluid-tight capsule 22 conforms contiguously with power cell housing 28 and main driver housing 26 to form a space-efficient streamlined body and handle of flosser 10. As indicated in FIG. 4, means for attaching attachment 14 include a circumferential lip 27 extending from a posterior end portion of capsule 22 to overlap an indented anterior end portion of housing 26. Conventional minute circumferential friction ridges (not shown) on the inner side of lip 27 are received in conventional minute circumferential friction grooves (not shown) defined in the indented end portion of housing 26 to hold attachment 14 and driver 12 together. Slight flexibility of plastic lip 27 enables the lip to flex sufficiently for a user to attach or detach attachment 14.

Operation of Flosser 10—FIGS. 1-4

A user will normally hold flosser 10 by gripping slip-resistant panels 30A and 30B with the fingers of one hand. By pushing button 40 forward, motor 32 is energized to drive floss take-up spool 50 to wind floss strand 60A. Thus, flossing can commence as the floss span is continuously being replaced. The longitudinal movement of the floss span helps in working the span between tightly contacting teeth. By holding flosser 10 as described above, the user's fingers act as a see-saw fulcrum so that eccentric weight 34 drives the floss span in a vertically orbital path while only slight motion occurs where held by the user's fingers. When the moving floss span is applied between adjacent teeth, the floss span will scrub along the contours of both teeth. The action of the floss span can be directed down to the attached gum tissue to clean and polish both teeth. The speed-reduction gears of gearbox 35 tame the floss span speed to make the orbital motions more comfortable for the user.

The user controls floss span tension by the amount of finger pressure applied to flexible panels 30A and 30B. The elastomeric inner surface of each panel engages and imposes drag on floss spool 58 positioned axially parallel to the panel ribs 31 and between the panels thereby controlling floss span tension according to the amount of user finger pressure. In the unlikely event that the floss span gets snagged on a dental appliance, for example, the user can release finger pressure on the panels to allow the floss to payout from the supply spool. Thus, the flosser can be removed from the user's mouth and the extended floss can be dislodged and wound so flossing can resume. Another way to payout floss, if necessary, is by pivoting button 40 rearward so motor 32 will operate in reverse to unwind some floss from take-up spool 50. Both floss payout methods can be used at the same time.

Second Embodiment—FIGS. 5 and 7

FIG. 5 shows a second embodiment of a flosser attachment as attachment 15 detachably connected to driver 12. Attachment 15 is similar to that of attachment 14 except for differences explained as follows: A take-up spool 72 replaced take-up spool 50. Included in spool 72 is an elongate bicone-shaped core 73 having opposite terminal ends 76 and 78 and a middle 80 that is equidistant from each of the ends 76 and 78. Core 73 includes a hard plastic body surrounding and coaxially fixed to a central portion of shaft 46. Thus, core 73 is tapered such that the diameters of the core are progressively smaller as the distance increases away from the middle 80 and toward ends 76 and 78, respectively. Core 73 includes an antifriction coating of PTFE 74 shown in cross-section and exaggerated in thickness for visibility. (An alternative efficacious antifriction coating could be substituted for PTFE.) Thus, the extremely slippery and tapering core 73 makes floss wound thereon prone to slide toward smaller core diameters. As shown in FIG. 5, floss is initially anchored perpendicularly to the middle 80 of core 73 by being tied through a tiny aperture therein. Hence, whenever tensioned floss is wound on the slippery tapering core, the latest floss loops tend to urge or forcibly displace at least some previous loops (other than the first or anchored loop) away from the middle 80. The displaced floss loops slide incrementally over lower resisting smaller core diameters and over smaller floss loops toward the ends of the core. This enables a substantial amount of used floss to be distributed along the length of the elongate core for high-capacity floss storage.

To inhibit microbial activity caused by oral microbes on wound used floss, the capsule is evacuated of air as described above wherein the evacuated air is partially replaced with a shallow amount of an antiseptic or antimicrobial solution 69 partially submerging take-up spool 72. Antimicrobial solution 69 is inserted into the capsule through a hollow needle (not shown) passed through elastomeric floss bearing 68. Antimicrobial solution 69 is a solution of ethanol, water, and liquid soap wherein the ethanol concentration is 70% by weight and the soap concentration is 3% by weight. The liquid soap is the type produced by saponification of lauric acid and is included in the solution as a lubricant, wetting agent, and to enhance the antimicrobial effect of the solution. The soap is comprised of a slippery surfactant that provides a lubricating benefit explained below.

In FIG. 7, an enlarged view of spool flange 54 shows the flange surface facing the spool core. A plurality of spiral grooves 70 extend between the periphery of the flange to the spool core hub or shaft 46. When spool 72 rotates clockwise relative to the view in FIG. 7, antimicrobial solution is guided along grooves 70 toward the spool core by a combination of wicking effect and gravity. Thus, the antimicrobial solution will wet the used floss on spool 72. The opposite flange of spool 72 and the flanges of spool 50 of the other embodiments define similar spiral grooves for wetting used floss with antimicrobial solution 69. The antimicrobial solution also lubricates the floss loops being urged or forced to slide toward the spool flanges thereby assisting the distribution of floss on the spool core by further reducing sliding friction.

To further insure that anaerobic microbial activity is inhibited, pure oxygen is injected into the vacuum of capsule 22 by a hollow needle passed through floss bearing 68. But total gas pressure in capsule 22 is set significantly below that of ambient atmospheric pressure.

Third Embodiment—FIGS. 6-10

In FIG. 6, a third automatic dental flosser embodiment 11 includes a flosser attachment 17 detachably connected to a power driver 13. This power driver is similar to power driver 12, but is shorter and includes conventional means (not shown) for tensioning the floss in order to be independent of elastomeric panels like those of power driver 12.

Flosser Attachment 17—FIGS. 6-10

Attachment 17 is similar to attachment 14 except for differences explained as follows: A bifurcated member 82 includes a short neck formed into a short handle or finger-grip 84 for greater advantage in manipulating the floss span to pass between contact areas of tightly contacting teeth. Finger-grip 84 is substantially flared posteriorly and is acutely arcuate for conforming to a user's thumb and forefinger when gripped between them. Finger-grip 84 also includes raised arcuate ribs 86 to provide further slip resistance when gripped.

Attachment 17 includes a floss cutter 88 as an added safety feature for cutting floss in the unlikely event that the floss span gets snagged, such as on an appliance in the user's oral cavity. Floss cutter 88 is positioned through and across an elongate floss guide groove 66A which is similar to floss guide groove 66 and guides floss on route from the supply spool to the flossing tines and then to the take-up spool. As in the other embodiments, the clean floss and the used floss are spaced slightly apart in guide groove 66A. As explained below, cutter 88 does not impede normal floss flow in guide groove 66A. But when actuated, cutter 88 cuts off a loop of floss strand 60B in the guide groove that is going to and coming from the tines.

As best shown in FIG. 8, cutter 88 includes a cylindrical tube 90 defining a slanted opening 91 cut 180 degrees through the diameter of tube 90. An angled circumferential edge defining opening 91 is honed to form a razor-sharp semicircular cutting blade 92. (An alternative to cylindrical tube 90 could be a tube having a square or rectangular cross-section.) A first end portion of tube 90 is capped by a fixed annular button or finger rest 93. An opposite or second end portion of tube 90 contains an end portion of a helical spring 94 held therein by dimples 95 in tube 90.

Spring 94 and the second end portion of tube 90 are contained in a deep bore/hole in the rigid plastic housing of attachment 17 such that tube 90 is slidably supported to move longitudinally in the bore/hole. Waterproof epoxy 96 retains a bottom end of spring 94 in the bore/hole. Opening 91 is aligned with floss guide groove 66A to avoid impeding normal floss flow in the guide groove.

The combination is arranged so that cutting blade 92 is movably supported and positioned proximate and transversely of elongate floss guide groove 66A for severing the loop of floss strand 60B in the guide groove. When finger rest 93 is pressed by a user, cutter 88 and its cutting blade 92 move from a first position (FIG. 8) toward a second position (FIG. 9), thereby severing the tensioned loop of floss strand 60B going to and coming from the tines. Spring 94 then urges cutter 88 to move back to the first position. The user can then draw enough floss out of the flosser spools to tie the severed floss end portions together and can resume flossing.

FIG. 10 shows an enlarged view of elastomeric self-sealing floss bearing 68 forming a fluid-tight seal around floss 60B entering or leaving the capsule. (For clarity, the portion of floss 60B headed for the tines is not shown.) The elastomeric floss bearing defines a passageway enabling the floss to pass through the bearing. The passageway is defined as a fluid-tight portion 29 aligned and connected between two opposite funnel-shaped entrance portions. The first of the opposite entrance portions includes a wide open mouth 21 wherein the entrance portion gradually decreases in diameter as the distance from its mouth increases until reaching fluid-tight portion 29 so that floss having a floss knot 25 can be pulled through the fluid-tight passageway and enter the capsule.

The second of the two opposite funnel-shaped entrance portions includes a wide open mouth 23 wherein the second entrance portion gradually decreases in diameter as the distance from its mouth increases until reaching fluid-tight portion 29 so that floss having floss knot 25 can be pulled through the fluid-tight passageway (in the opposite direction) and leave the capsule. A knot such as floss knot 25 results when a user ties severed or broken floss end portions together.

The occurrence of a floss break is rare because the precursor to a floss break is usually frayed floss. But all floss spans are continuously being replaced in the present flosser embodiments while they work. Therefore floss breaks are normally avoided. Nevertheless, if a floss break occurs, the broken floss end portions can be tied together and flossing can resume.

Referring back to FIG. 8, an antifriction coating of PTFE 97 lines the surface of all the floss guides to reduce friction and prolong the electrical charge in power cell 36. As indicated in FIG. 6, an antifriction coating of PTFE 75 lines augers 56 that form the core of spool 50 and guide the distribution of floss.

The fluid-tight capsule contains the same antimicrobial fluids as the second embodiment in order to sanitize used floss wound onto take-up spool 50. FIG. 6 shows that the flanges of spool 50 and augers 56 are partially submerged in antimicrobial solution 69. When spool 50 rotates, the flange grooves and augers 56 distribute the antimicrobial solution on used floss wound on the core of spool 50. The various positions of each flosser embodiment during use, including an upside-down position when flossing the user's upper teeth, also contribute to distribution of the antimicrobial liquid onto the used floss.

When the space between the threads of augers 56 are filled with floss, the bicone shape of the combination lubricated by the antimicrobial solution will make additional floss being wound become prone to slide incrementally toward the spool flanges. Hence, the additional floss will be distributed in a similar manner as described for distribution of floss on bicone-shaped core 73 of spool 72.

The top view of flosser embodiment 11 is similar to that of flosser embodiment 10 (FIGS. 2 and 3) except that driver 13 and the neck of bifurcated member 82 are shorter.

Figure 11:
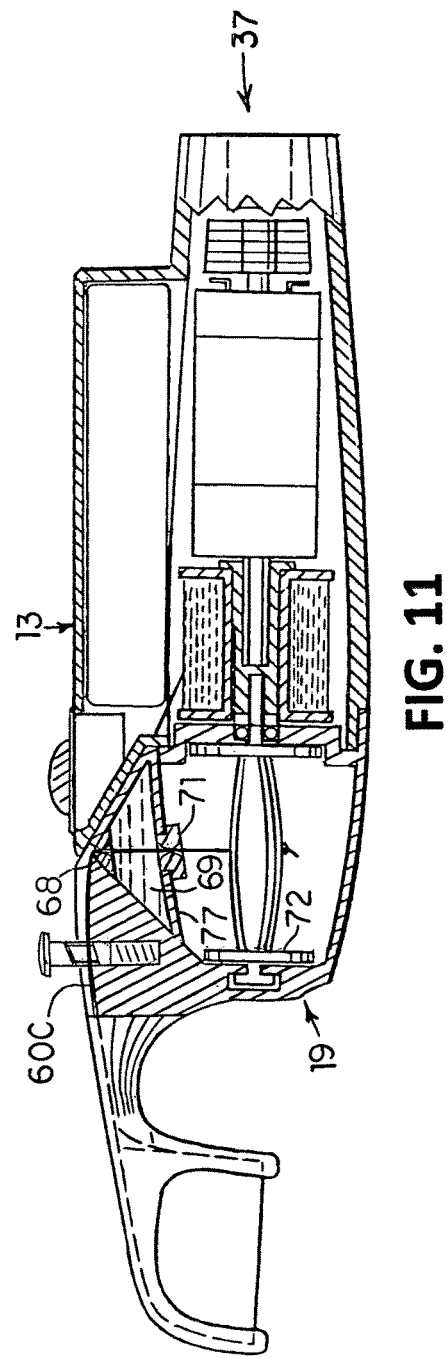
FIG. 11 is side sectional view of a fourth flosser embodiment taken through its midline.

Fourth Embodiment—FIG. 11

In FIG. 11, a fourth automatic dental flosser embodiment 37 includes a flosser attachment 19 detachably connected to power driver 13.

Flosser Attachment 19—FIG. 11

Attachment 19 is similar to attachment 17 except for differences explained as follows: A partition is added within the capsule to form a fluid-tight chamber or reservoir 77. An annular aperture in the partition is plugged with an annular self-sealing elastomeric floss bearing 71 that is internally structured like floss bearing 68. Thus, floss bearings 68 and 71 form fluid-tight seals around floss 60C passing in and out of reservoir 77. An end portion of floss 60C is attached to take-up spool 72 which replaced spool 50. Contained within reservoir 77 is antimicrobial solution 69 for inhibiting microbial activity on the used floss passing through. Hence, the reservoir bath treats floss to be wound on spool 72 to avoid microbial generated gas and odor. As explained above for the second embodiment, spool 72 self-distributes tensioned floss for high-capacity storage. All other fluid is evacuated from the capsule to make room for incoming floss.

It should be understood that an alternative antimicrobial solution or disinfectant could replace solution 69 in the embodiments, especially an alternative solution that prevents the generation of gas and odor caused by microbes on the used floss.

SCOPE AND CONCLUSION

While the description above is of specific embodiments, these are not intended to be limited in scope to the embodiments shown and described, but rather as some useful examples. Each of these embodiments can give rise to various models and other embodiments.

In the embodiments shown, the tine arrangement is F-shaped but can alternatively be Y-shaped. By marketing both types of tine arrangements, consumers will be able to select the type they prefer.

Eccentric weight 34 could be obviated or replaced by a method of longitudinally pulsating the flowing floss span by an electronic oscillator or by mechanical means driven by the posterior drive shaft of motor 32. But, such a modification would not necessarily be advised by the present inventor.

A useful added feature could drive eccentric weight 34 selectively rather than every time the motor runs. This could be achieved by supporting weight 34 to rotate by slipping about a short shaft fixed to housing 26 and coaxially aligned with the posterior motor shaft. A user-actuated clutch or coupling could selectively connect weight 34 with the motor shaft when orbital motion of the floss span is desired.

Other antimicrobial fluid(s) could be substituted is place of ethanol and/or oxygen. Inhibiting microbial activity is important because common microbes generate odorous gases and could cause other undesirable ramifications.

An oral examination illuminator having a bright LED can be embedded in the plastic housing in front of the capsule of any of the attachment embodiments. The illumination can be directed into the user's oral cavity while flossing. Power leads to the LED and to a light switch can be detachably connectable to power cell 36 for energizing the illuminator.

Thus, the scope of the embodiments should be determined by the appended claims and their legal equivalents rather than by the examples given.

What is claimed is:

1. A dental flosser attachment detachably connectable to a driver, said attachment comprising:

a bifurcated member forming a pair of flossing tines for supporting a dental floss span to floss teeth;

a rotatably supported floss take-up spool connected to said bifurcated member and arranged for being driven by the driver to wind used dental floss from said tines, said take-up spool having a spool core and at least one spool flange connected to said spool core, said flange having an inner surface facing said spool core, said inner surface defining a plurality of spiral grooves extending from a periphery of said flange to said spool core wherein said plurality of spiral grooves converge toward said spool core; and a fluid tight enclosure surrounding said take-up spool, said enclosure serving for containing antimicrobial liquid to wet used floss wound onto said spool core thereby inhibiting microbial activity on the used floss;

whereby said inner surface of said flange serves to convey the antimicrobial liquid to wet the wound used floss when the liquid level in said enclosure is below the wound used floss and said spool is being rotated partly submerged in the liquid.

2. The dental flosser attachment of claim 1 further comprising an antiseptic fluid contained in said fluid tight enclosure.

3. The dental flosser attachment of claim 2 wherein said antiseptic fluid is an antiseptic or antimicrobial liquid which at least partially submerges said floss take-up spool such that rotation of said floss take up spool conveys said liquid to wet and disinfect used floss.

4. The dental flosser attachment of claim 2 wherein said antiseptic fluid is an antimicrobial gas.

5. The dental flosser attachment of claim 2 wherein said antiseptic fluid comprises an antimicrobial liquid and an antimicrobial gas.

6. The dental flosser attachment of claim 1 wherein said fluid tight enclosure is at least partially evacuated of air such that gas pressure within said enclosure is below that of ambient atmospheric pressure.

7. The dental flosser attachment of claim 1 wherein said core has an antifriction coating for enabling floss being wound thereon to be distributed along said core by sliding along said core.

8. The dental flosser attachment of claim 1 wherein said fluid tight enclosure includes an elastomeric self-sealing bearing defining a passageway therethrough and forming a fluid tight seal around floss entering said enclosure through said passageway, said passageway having an entrance portion connected to a fluid tight portion wherein said entrance portion includes a wide mouth and said entrance portion gradually decreases in diameter as the distance from said wide mouth increases.

9. A dental flosser comprising:
a housing;
a bifurcated member forming a pair of flossing tines for supporting a dental floss span to floss teeth, said bifurcated member forming a distal portion of said housing;
a rotatably supported floss supply spool connected to a proximal portion of said housing for replacing used floss with clean floss;
an elongate floss guide extending between said floss supply spool and said bifurcated member and along said housing for guiding floss on route from said spool to said tines;
a hole formed in said housing, said hole extending transversely with respect to said floss guide;
a slidably supported cutting blade positioned in said hole and extending transversely of said floss guide;
a finger rest attached to said cutting blade; and
a spring positioned within said hole and operatively coupled to said cutting blade to urge said cutting blade toward a first position wherein pressing said finger rest causes said cutting blade to slide within said hole toward a second position thereby cutting floss in said floss guide.

10. The dental flosser attachment as defined in claim 9 further comprising an enclosure positioned in said proximal portion of said housing and a rotatably supported floss take-up spool housed in said enclosure, wherein said floss guide serves to guide floss on route from said bifurcated member to said take-up spool while passing across said cutting blade such that pressing said finger rest results in severing off a floss loop that contains the floss span.

11. The dental flosser attachment as defined in claim 9 wherein said bifurcated member includes a short neck formed into a finger-grip for greater advantage in manipulating said floss span, said finger-grip having a substantially flared posterior portion and being acutely concave for conforming to a user's thumb and forefinger when gripped therebetween, said finger-grip further including a plurality of raised arcuate ribs on said neck.

12. A dental flosser attachment comprising:
a bifurcated member forming a pair of flossing tines for supporting a dental floss span to floss teeth, said bifurcated member having a distal end defined by said pair of flossing tines and a proximal end opposite the distal end;
a fluid tight enclosure connected to said proximal end of said bifurcated member;
a floss take-up spool rotatably supported within said fluid tight enclosure, said take-up spool having an elongated core having opposing terminal ends and at least one flange connected to at least one of said terminal ends, said core having a maximum diameter in a middle of said core and said core tapering from said middle toward said terminal ends and said flange having an inner surface facing said core, said inner surface defining a plurality of grooves thereon;
an antiseptic fluid contained in said fluid tight enclosure for sanitizing used floss and storing used floss in a sanitary environment; and
means for rotatably supporting a floss supply spool outside of said fluid-tight enclosure.

13. The dental flosser attachment of claim 12 wherein said antiseptic fluid is an antiseptic or antimicrobial liquid which at least partially submerges said floss take-up spool such that rotation of said floss take up spool conveys said liquid to wet and disinfect used floss.

14. The dental flosser attachment of claim 12 wherein said antiseptic fluid is an antimicrobial gas.

15. The dental flosser attachment of claim 12 wherein said antiseptic fluid comprises an antimicrobial liquid and an antimicrobial gas.

16. The dental flosser attachment of claim 12 wherein said fluid tight enclosure is at least partially evacuated of air such that gas pressure within said enclosure is below that of ambient atmospheric pressure.

17. The dental flosser attachment of claim 12 wherein said core has an antifriction coating for enabling floss being wound thereon to be distributed along said core by sliding along said core.

18. The dental flosser attachment of claim 12 wherein said fluid tight enclosure includes an elastomeric self-sealing bearing defining a passageway therethrough and forming a fluid tight seal around floss entering said enclosure through said passageway, said passageway having an entrance portion connected to a fluid tight portion wherein said entrance portion includes a wide mouth and said entrance portion gradually decreases in diameter as the distance from said wide mouth increases.

* * * * *